(12) United States Patent
Gao et al.

(10) Patent No.: US 12,040,707 B2
(45) Date of Patent: Jul. 16, 2024

(54) STEP-UP CIRCUIT AND STEP-UP CIRCUIT CONTROL METHOD

(71) Applicant: Huawei Digital Power Technologies Co., Ltd., Shenzhen (CN)

(72) Inventors: Yongbing Gao, Shanghai (CN); Jun Wang, Shanghai (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 324 days.

(21) Appl. No.: 17/473,511

(22) Filed: Sep. 13, 2021

(65) Prior Publication Data

US 2021/0408909 A1 Dec. 30, 2021

Related U.S. Application Data

(63) Continuation of application No. PCT/CN2020/102793, filed on Jul. 17, 2020.

(30) Foreign Application Priority Data

Jul. 19, 2019 (CN) .......................... 201910657370.5

(51) Int. Cl.
*H02M 3/158* (2006.01)
(52) U.S. Cl.
CPC .................................. *H02M 3/158* (2013.01)
(58) Field of Classification Search
CPC ............ H02M 3/00; H02M 3/02; H02M 3/04; H02M 3/06; H02M 3/07–078;

(Continued)

(56) References Cited

U.S. PATENT DOCUMENTS

| 2018/0205315 | A1* | 7/2018 | Giuliano ................. H02M 3/07 |
| 2019/0036450 | A1 | 1/2019 | Szczeszynski et al. |

(Continued)

FOREIGN PATENT DOCUMENTS

| CN | 101030701 A | 9/2007 |
| CN | 102918759 A | 2/2013 |

(Continued)

OTHER PUBLICATIONS

English translation of CN106230253. (Year: 2016).*

(Continued)

*Primary Examiner* — Thienvu V Tran
*Assistant Examiner* — Carlos O Rivera-Perez
(74) *Attorney, Agent, or Firm* — HAUPTMAN HAM, LLP

(57) ABSTRACT

This application relates to the field of circuit technologies, and provides a step-up circuit and a step-up circuit control method. The step-up circuit includes a power supply, an inductor, N switch components, N-1 flying capacitors, N flyback diodes, a pre-charge unit, and an output unit. The N switch components are connected in series, a first switch component of the N switch components is connected to a first terminal of the power supply through the inductor, and an $N^{th}$ switch component is connected to a second terminal of the power supply. At least two switch components of the N switch components have withstand voltage specifications different from each other. Values of voltages withstood by switch components with different withstand voltage specifications during normal operation are also different from each other. N is a positive integer.

20 Claims, 6 Drawing Sheets

(58) Field of Classification Search
CPC ...... H02M 3/135; H02M 3/137; H02M 3/139;
H02M 3/142; H02M 3/145; H02M 3/155;
H02M 3/1552; H02M 3/156; H02M
3/158; H02M 3/1582; H02M 3/1584;
H02M 3/1588; H02M 7/44; H02M 7/48;
H02M 7/483–49; H02M 1/0048; H02M
1/0051; H02M 1/0054; H02M 1/0058;
H02M 1/0067; H02M 1/0095; H02M
1/32; H02M 1/322; H02M 1/34; H02M
1/36
USPC ........ 323/222–226, 266, 271–276, 282–288,
323/351, 901; 363/50, 56.12, 123, 124
See application file for complete search history.

(56) References Cited

U.S. PATENT DOCUMENTS

| 2019/0173374 A1 | 6/2019 | Fu et al. | |
| 2020/0076301 A1* | 3/2020 | Zhuang | ................ H02M 3/158 |

FOREIGN PATENT DOCUMENTS

| CN | 106230253 A | 12/2016 |
| CN | 106787899 A | 5/2017 |
| CN | 109391151 A | 2/2019 |
| CN | 208489802 U | 2/2019 |
| CN | 109756115 A | 5/2019 |
| CN | 110429815 A | 11/2019 |
| JP | 2008148501 A | 6/2008 |
| JP | 2019110704 A | 7/2019 |
| WO | 2017018147 A1 | 2/2017 |
| WO | 2018045936 A1 | 3/2018 |
| WO | 2021013101 A1 | 1/2021 |

OTHER PUBLICATIONS

Muhammad Nawaz: "Predicting potential of 4H—SiC power devices over 10 kV", Power Electronics and Drive Systems (PEDS), 2013 IEEE 10th International Conference on, IEEE, Apr. 22, 2013, total 6 pages.
European Search Report issued in corresponding European Application No. 20844545.2, dated Mar. 30, 2022, pp. 1-9.
Chinese Office Action issued in corresponding Chinese Application No. 201910657370.5, dated Sep. 30, 2020, pp. 1-6.
International Search Report issued in corresponding International Application No. PCT/CN2020/102793, dated Sep. 23, 2020, pp. 1-11.
Stillwell Andrew et al: "A 5-level flying capacitor multi-level converter with integrated auxiliary power supply and start-up", 2017 IEEE Applied Power Electronics Conference and Exposition (APEC), IEEE, Mar. 26, 2017 (Mar. 26, 2017), pp. 2932-2938, XP033098677, Total 7 Pages.
India Examination Report issued in corresponding India Application No. 202237004531, dated Jun. 30, 2022, pp. 1-6.
"L TC7820 Fixed Ratio High Power Inductorless (Charge Pump) DC/DC Controller", Apr. 4, 2017 (Apr. 4, 2017), pp. 1-28, XP055958843, Total 28 Pages.
European Office Action issued in corresponding European Application No. 20844545.2, dated Sep. 13, 2022, pp. 1-6.

* cited by examiner

STEP-UP CIRCUIT AND STEP-UP CIRCUIT CONTROL METHOD

CROSS-REFERENCE TO RELATED APPLICATIONS

This application is a continuation of International Application No. PCT/CN2020/102793, filed on Jul. 17, 2020, which claims priority to Chinese Patent Application No. 201910657370.5, filed on Jul. 19, 2019, the disclosures of the aforementioned applications are hereby incorporated by reference in their entireties.

TECHNICAL FIELD

This application relates to the field of circuit technologies, and in particular, to a step-up circuit and a step-up circuit control method.

BACKGROUND

A step-up circuit (a common step-up circuit includes a boost circuit, "boost" in Chinese means increasing or improving, and boost circuits are not a specific type of circuit, but a general type of step-up circuit that receives a voltage and outputs a higher voltage) is a common switched-mode direct-current step-up circuit that, by turning on or off a switch component, controls an inductor to store or release energy, to produce an output voltage that is greater than an input voltage, thereby implementing a voltage boost.

To improve an output waveform of a step-up circuit, a plurality of switch components are usually used in the step-up circuit to control charging or discharging of the step-up circuit (the charging or discharging is controlled by turning on or off a switch component). In a traditional step-up circuit, each switch component withstands a same voltage during operation, and each switch component also corresponds to a same withstand voltage specification.

However, this traditional scheme may lead to a big difference between a voltage actually withstood by a switch component during normal operation of the step-up circuit and a withstand voltage specification of the switch component due to selection of the withstand voltage specification for the switch component. That is, in the traditional scheme, switch components with a high withstand voltage specification may be indiscriminately selected, but these switch components with the high withstand voltage specification usually have poor switching performance, resulting in low system efficiency of the step-up circuit.

SUMMARY

This application provides a step-up circuit and a step-up circuit control method, to improve working efficiency of step-up circuits.

According to a first aspect, a step-up circuit is provided. The step-up circuit includes a power supply, an inductor, N switch components, N-1 flying capacitors, N flyback diodes, and a pre-charge unit.

The N switch components are connected in series. Among the N switch components, a first terminal of a first switch component is connected to a first terminal of the power supply through the inductor, and a second terminal of an $N^{th}$ switch component is connected to a second terminal of the power supply. Among the N switch components, K switch components have withstand voltage specifications different from each other, and voltages withstood by the K switch components during normal operation are different from each other, where both N and K are positive integers, N>1, and K≤N.

An $i^{th}$ flying capacitor of the N-1 flying capacitors corresponds to first i switch components of the N switch components, and during normal operation of the step-up circuit, a voltage withstood by the $i^{th}$ flying capacitor is a sum of voltages withstood by the first i switch components, where i is a positive integer less than N.

In the step-up circuit, a flying capacitor is a capacitor that is connected in parallel to a terminal of a switch component and a terminal of a flyback diode.

The N flyback diodes correspond to the N switch components on a one-to-one basis, and a voltage withstood by an $i^{th}$ flyback diode of the N flyback diodes is the same as that withstood by an $i^{th}$ switch component of the N switch components.

According to this application, a voltage across a flying capacitor may be controlled by an on or off time of the N switch components, to control the voltages withstood by the K switch components during normal operation to be different from each other.

In addition, a first terminal of the $i^{th}$ flying capacitor is connected to the first terminal of the first switch component through first i flyback diodes, and a second terminal of the $i^{th}$ flying capacitor is connected to a second terminal of the $i^{th}$ switch component.

A flyback diode (flyback diode), sometimes also referred to as a freewheeling diode or a snubber (snubber) diode, is a type of diode for use with inductive load. When a current of the inductive load abruptly changes or decreases, an abrupt voltage change occurs at both ends of the inductor. This may damage other elements. In the step-up circuit, a flyback diode is provided for the inductor, so that a current change in the step-up circuit can be smooth, thereby avoiding occurrence of an abrupt voltage change or an abrupt current change.

The pre-charge unit is configured to charge the N-1 flying capacitors before the step-up circuit outputs a voltage, so that the voltage across the $i^{th}$ flying capacitor is the sum of the voltages withstood by the first i switch components of the N switch components during normal operation.

During normal operation of the step-up circuit, a value of a voltage withstood by a switch component is the same as a value of a voltage withstood by a corresponding flyback diode. In addition, according to this application, a withstand voltage specification of a switch component may be the same as or different from that of a corresponding flyback diode, provided that the withstand voltage specification of the switch component is greater than a voltage actually withstood by the switch component and the withstand voltage specification of the flyback diode is greater than a voltage actually withstood by the flyback diode.

Optionally, the step-up circuit further includes an output unit, where a first terminal of the output unit is connected to the first terminal of the power supply through the N flyback diodes, and a second terminal of the output unit is connected to the second terminal of the power supply.

The output unit may include a resistor R and a capacitor C that are connected in parallel.

According to this application, switch components with different withstand voltage specifications exist in the step-up circuit, and the switch components with different withstand voltage specifications withstand different voltages during operation.

In this way, compared with a traditional scheme in which switch components with a same withstand voltage specification are selected for a step-up circuit, a voltage actually withstood by a switch component of the step-up circuit can be closer to a withstand voltage specification of the switch component, thereby improving system efficiency of the step-up circuit.

Generally, when a voltage actually withstood by a switch component greatly differs from a withstand voltage specification of the switch component, performance of the switch component is usually poor, resulting in a poor system efficiency indicator of a corresponding step-up circuit. By contrast, when the voltage actually withstood by the switch component is close to the withstand voltage specification of the switch component, performance of the switch component is better, improving the system efficiency indicator of the corresponding step-up circuit.

With reference to the first aspect, in some implementations of the first aspect, K flyback diodes of the N flyback diodes have withstand voltage specifications different from each other, and the K flyback diodes correspond to the K switch components of the N switch components on a one-to-one basis.

According to this application, the K flyback diodes, of the N flyback diodes, corresponding to the K switch components that have different withstand voltage specifications also have different withstand voltage specifications. Therefore, compared with a manner in which the N flyback diodes have a same withstand voltage specification, voltages withstood by the K flyback diodes during operation can be close to corresponding withstand voltage specifications to a maximum extent, thereby improving performance of a flyback diode and further improving system efficiency of the step-up circuit.

With reference to the first aspect, in some implementations of the first aspect, the step-up circuit further includes a charging switch.

The charging switch is disposed between the $N^{th}$ switch component and the second terminal of the power supply, the $N^{th}$ switch component is connected to the power supply when the charging switch is closed, and the $N^{th}$ switch component is disconnected from the power supply when the charging switch is open.

By using the charging switch, the pre-charge unit can be flexibly controlled to charge a flying capacitor.

The charging switch is disposed between the $N^{th}$ switch component and the power supply. Therefore, only one charging switch is needed to control pre-charging, thereby reducing a quantity of switches. In addition, the charging switch is disposed between the $N^{th}$ switch component and the power supply, thereby reducing an overall on-state loss compared with a manner in which each of the N switch components is provided with a switch.

Generally, before the step-up circuit works, the charging switch is open, and a flying capacitor is charged by using the pre-charge unit. After charging is completed, the charging switch is closed, and then the step-up circuit can normally work.

Optionally, the charging switch includes any one of a relay, a contactor, and a bidirectional semiconductor switch.

With reference to the first aspect, in some implementations of the first aspect, at least one of the N flyback diodes is connected in parallel to a metal-oxide-semiconductor field-effect transistor (MOSFET), where the MOSFET has a third quadrant conduction feature.

Further, each of the N flyback diodes is connected in parallel to a MOSFET.

The on-state loss can be reduced by connecting a MOSFET in parallel to a flyback diode.

With reference to the first aspect, in some implementations of the first aspect, each of the N switch components is an insulated gate bipolar transistor (IGBT), or each of the N switch components is a MOSFET.

With reference to the first aspect, in some implementations of the first aspect, each of the N switch components is connected in reverse parallel to a diode.

With reference to the first aspect, in some implementations of the first aspect, the step-up circuit is a positive multi-level step-up circuit.

Specifically, when the step-up circuit is a positive multi-level step-up circuit, the first terminal of the power supply is a positive electrode of the power supply, and the second terminal of the power supply is a negative electrode of the power supply.

A multi-level step-up circuit is generally a step-up circuit that can output a plurality of (generally three or more) different levels. Generally, a step-up circuit that includes more switch components can output more levels.

With reference to the first aspect, in some implementations of the first aspect, the step-up circuit is a negative multi-level step-up circuit.

Specifically, when the step-up circuit is a negative multi-level step-up circuit, the first terminal of the power supply is a negative electrode of the power supply, and the second terminal of the power supply is a positive electrode of the power supply.

According to a second aspect, a step-up circuit control method is provided, where the method is applied to the step-up circuit according to the first aspect. The method includes: controlling, before the step-up circuit outputs a voltage, the pre-charge unit to charge the N-1 flying capacitors, so that the voltage across the $i^{th}$ flying capacitor is the sum of the voltages withstood by the first i switch components of the N switch components during normal operation; and controlling the N switch components to be on or off, so that the step-up circuit outputs a voltage.

According to this application, switch components with different withstand voltage specifications exist in the step-up circuit. The switch components are charged by using the pre-charge unit, so that voltages withstood by some switch components during operation can be close to withstand voltage specifications of the switch components. In this way, compared with a traditional scheme in which switch components with a same withstand voltage specification are selected for a step-up circuit, a voltage actually withstood by a switch component of the step-up circuit can be closer to a withstand voltage specification of the switch component, thereby improving system efficiency of the step-up circuit.

With reference to the second aspect, in some implementations of the second aspect, the step-up circuit includes the charging switch, where before the controlling the pre-charge unit to charge the N-1 flying capacitors, the method further includes controlling the charging switch to be open, and after the pre-charge unit completes charging the N-1 flying capacitors, the method further includes controlling the charging switch to be closed.

A flying capacitor can be flexibly charged by using the charging switch.

According to a third aspect, a step-up apparatus is provided, where the step-up apparatus includes the step-up circuit.

DESCRIPTION OF EMBODIMENTS

The following describes technical solutions of this application with reference to accompanying drawings.

Figure 1:
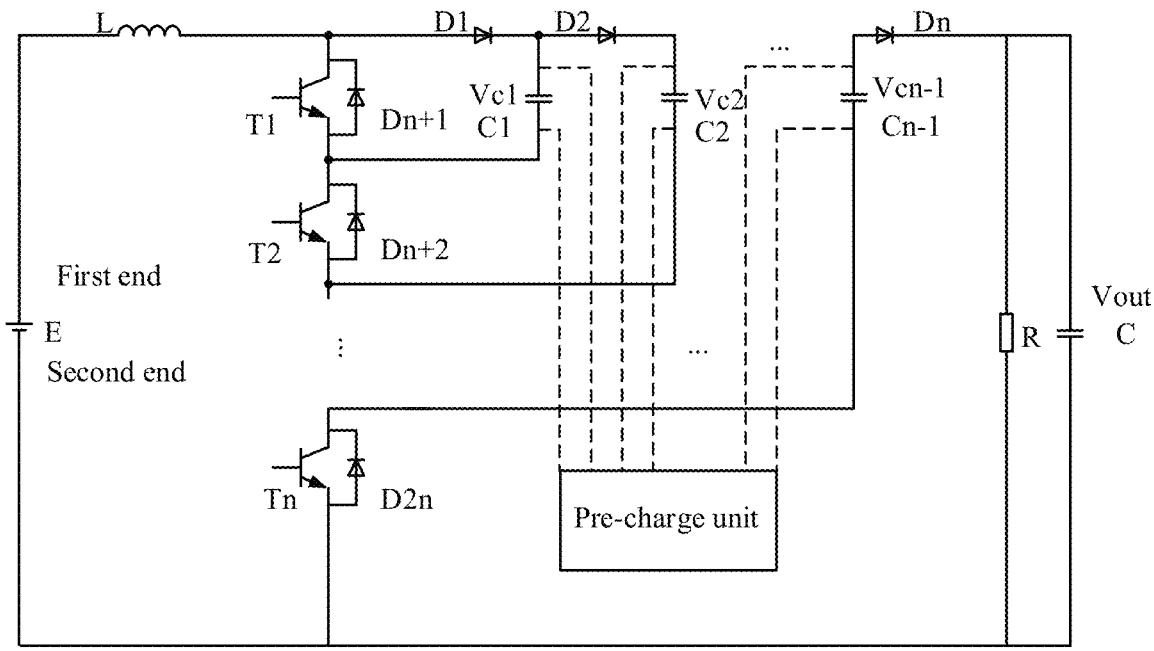
FIG. 1 is a schematic diagram of a step-up circuit according to an embodiment of this application.

FIG. 1 is a schematic diagram of a step-up circuit according to an embodiment of this application.

The step-up circuit shown in FIG. 1 includes a power supply E, an inductor L, N switch components, N-1 flying capacitors, N flyback diodes, and a pre-charge unit. The following describes in detail modules or units of the step-up circuit shown in FIG. 1.

The power supply E:

The power supply E is configured to provide an input voltage for the step-up circuit. The step-up circuit adjusts the input voltage, so that a final output voltage is greater than the input voltage, thereby implementing a voltage boost.

The inductor L:

The inductor L is an energy storage element. The inductor L is connected to a first terminal of the power supply. In the step-up circuit shown in FIG. 1, the inductor L is connected to a positive electrode of the power supply.

The N switch components:

As shown in FIG. 1, the N switch components include T1 to Tn, and the N switch components are connected in series. Among the N switch components, a first terminal of a first switch component is connected to the first terminal of the power supply E through the inductor L, and a second terminal of an $N^{th}$ switch component is connected to a second terminal of the power supply E (in the step-up circuit shown in FIG. 1, the second terminal of the power supply E is a negative electrode). Among the N switch components, K switch components (the K switch components are not shown in FIG. 1) have withstand voltage specifications different from each other (any two switch components of the K components have withstand voltage specifications different from each other). Voltages withstood by the K switch components during normal operation are also different from each other (voltages withstood by any two switch components of the K components during normal operation are different from each other). Both N and K are positive integers, N>1, and K≤N.

As shown in FIG. 1, the first terminal of the first switch component T1 is an end, of the first switch component T1, connected to the inductor L. The second terminal of the $N^{th}$ switch component Tn is an end, of the $N^{th}$ switch component Tn, directly connected to the power supply.

In addition, a first terminal of an $i^{th}$ flying capacitor is connected to the first terminal of the first switch component through first i flyback diodes, and a second terminal of the $i^{th}$ flying capacitor is connected to a second terminal of an $i^{th}$ switch component.

As shown in FIG. 1, a first terminal of a flying capacitor C1 is connected to the first terminal of the first switch component T1 through a first flyback diode D1, and a second terminal of the flying capacitor C1 is connected to a second terminal of the first switch component. A first terminal of a flying capacitor C2 is connected to the first terminal of the first switch component T1 through the first flyback diode D1 and a second flyback diode D2, and a second terminal of the flying capacitor C2 is connected to a second terminal of a second switch component T2.

In the step-up circuit, a flying capacitor is a capacitor that is connected in parallel to a terminal of a switch component and a terminal of a flyback diode. For example, in FIGS. 1, T1 and D1 are connected in series, and then connected in parallel to C1, where C1 is a flying capacitor. Similarly, C2 to Cn-1 are also flying capacitors.

Each of the N switch components may specifically be an insulated gate bipolar transistor (IGBT), or each of the N switch components is a metal-oxide-semiconductor field-effect transistor (MOSFET), or referred to as a metal-oxide-silicon transistor for short.

For the N switch components, a voltage withstood by each switch component during normal operation generally needs to be less than a withstand voltage specification of the switch component (the withstand voltage specification represents a maximum value of a voltage that the switch component can withstand during normal operation). For example, if a voltage to be withstood by a switch component during normal operation is 600 V, a switch component with a withstand voltage specification of 650 V may be selected.

For example, T1 and T2 of the K switch components have withstand voltage specifications different from each other, where T1 has a withstand voltage specification of 650 V, and T2 has a withstand voltage specification of 1,200 V. In this case, T1 may withstand a voltage of 500 V during operation, and T2 may withstand a voltage of 1,000 V during operation, and therefore the voltages withstood by T1 and T2 during operation are different from each other.

The N-1 flying capacitors:

As shown in FIG. 1, the N-1 flying capacitors include C1 to Cn. Among the N-1 flying capacitors, the $i^{th}$ flying capacitor corresponds to first i switch components of the N switch components. During normal operation of the step-up circuit shown in FIG. 1, a voltage withstood by the $i^{th}$ flying capacitor is a sum of voltages withstood by the first i switch components, where i is a positive integer less than N.

For example, in the step-up circuit shown in FIG. 1, C1 corresponds to the first switch component T1. During normal operation of the step-up circuit, a voltage (Vc1) withstood by C1 is the same as a voltage withstood by the first switch component.

For another example, in the step-up circuit shown in FIG. 1, C2 corresponds to first two switch components (T1 and T2). During normal operation of the step-up circuit, a voltage (Vc2) withstood by C2 is equal to a sum of a voltage withstood by T1 and a voltage withstood by T2. Cn-1 corresponds to first N-1 switch components (T1 to Tn-1). During normal operation of the step-up circuit, a voltage (Vcn-1) withstood by Cn-1 is equal to a sum of voltages withstood by T1 to Tn-1.

The N flyback diodes:

A flyback diode, sometimes also referred to as a freewheeling diode or a snubber diode, is a type of diode for use with inductive load. When a current of the inductive load abruptly changes or decreases, an abrupt voltage change occurs at both ends of the inductor. This may damage other elements. In the step-up circuit, a flyback diode is provided for the inductor, so that a current change in the step-up circuit can be smooth, thereby avoiding occurrence of an abrupt voltage change or an abrupt current change.

As shown in FIG. 1, the N flyback diodes include D1 to Dn. The N flyback diodes correspond to the N switch components on a one-to-one basis. To be specific, an $i^{th}$ flyback diode of the N flyback diodes corresponds to the $i^{th}$ switch component of the N switch components, and a voltage withstood by the $i^{th}$ flyback diode is the same as that withstood by the $i^{th}$ switch component.

Specifically, as shown in FIG. 1, a first diode D1 of the N flyback diodes corresponds to the first switch component T1 of the N switch components, a second diode D2 of the N flyback diodes corresponds to the second switch component T2 of the N switch components, and an $Nt^h$ diode Dn of the N flyback diodes corresponds to the $N^{th}$ switch component Tn of the N switch components.

During normal operation of the step-up circuit, a value of a voltage withstood by a switch component is the same as a value of a voltage withstood by a corresponding flyback diode.

For example, as shown in FIG. 1, during normal operation of the step-up circuit, a value of a voltage withstood by T1 is the same as a value of a voltage withstood by D1, a value of a voltage withstood by T2 is the same as a value of a voltage withstood by D2, and a value of a voltage withstood by Tn is the same as a value of a voltage withstood by Dn.

It should be understood that for the N flyback diodes, a voltage withstood by each flyback diode during normal operation generally needs to be less than a withstand voltage specification of the flyback diode (the withstand voltage specification represents a maximum value of a voltage that the flyback diode can withstand during normal operation). For example, if a voltage to be withstood by a flyback diode during normal operation is 610 V, a flyback diode with a withstand voltage specification of 650 V may be selected.

In addition, according to this application, a withstand voltage specification of a switch component may be the same as or different from that of a corresponding flyback diode, provided that the withstand voltage specification of the switch component is greater than a voltage actually withstood by the switch component and the withstand voltage specification of the flyback diode is greater than a voltage actually withstood by the flyback diode. For example, if voltages to be withstood by T1 and D1 during normal operation each are 610 V, T1 and D1 each may have a withstand voltage specification of 650 V. Alternatively, if voltages to be withstood by T1 and D1 during normal operation each are 610 V, T1 may have a withstand voltage specification of 650 V, and D1 may have a withstand voltage specification greater than 650 V.

The pre-charge unit:

The pre-charge unit is configured to charge the N-1 flying capacitors before the step-up circuit outputs a voltage (normally works), so that the voltage across the $i^{th}$ flying capacitor is the sum of the voltages withstood by the first i switch components of the N switch components during normal operation.

For example, as shown in FIG. 1, the pre-charge unit charges the flying capacitors C1 to Cn-1, so that a voltage across C1 is a voltage withstood by T1 during normal operation, a voltage across C2 is a sum of voltages withstood by T1 and T2 during normal operation, and a voltage across Cn-1 is a sum of voltages withstood by T1 to Tn-1 during normal operation.

According to this application, switch components with different withstand voltage specifications exist in the step-up circuit, and the switch components with different withstand voltage specifications withstand different voltages during operation. In this way, compared with a traditional scheme in which switch components with a same withstand voltage specification are selected for a step-up circuit, a voltage actually withstood by a switch component of the step-up circuit can be closer to a withstand voltage specification of the switch component, thereby improving system efficiency of the step-up circuit.

For the N flyback diodes, diodes with a relatively large withstand voltage specification may be uniformly selected as the N flyback diodes, or diodes with different withstand voltage specifications may be selected based on a difference between voltages to be withstood.

Optionally, the N flyback diodes include K flyback diodes (not shown in FIG. 1). The K flyback diodes correspond to the K switch components of the N switch components on a one-to-one basis, and the K flyback diodes have withstand voltage specifications different from each other.

For example, if T1 and T2 of the step-up circuit in FIG. 1 have withstand voltage specifications different from each other, D1 and D2 also have withstand voltage specifications different from each other because T1 and T2 correspond to the flyback diodes D1 and D2, respectively.

According to this application, the K flyback diodes, of the N flyback diodes, corresponding to the K switch components that have different withstand voltage specifications also have different withstand voltage specifications. Therefore, compared with a manner in which the N flyback diodes have a same withstand voltage specification, voltages withstood by the K flyback diodes during operation can be close to corresponding withstand voltage specifications to a maximum extent, thereby improving performance of a flyback diode and further improving system efficiency of the step-up circuit.

Figure 2:
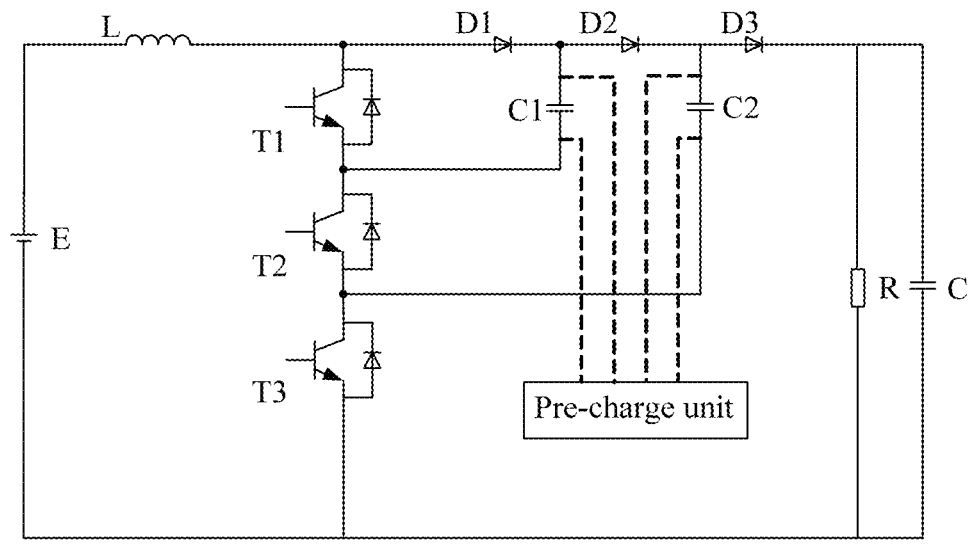
FIG. 2 is a schematic diagram of a step-up circuit according to an embodiment of this application.

As shown in FIG. 2, it is assumed that a step-up circuit according to this application includes three switch components (T1, T2, and T3), two flying capacitors (C1 and C2), and three flyback diodes (D1, D2, and D3). If an input voltage of the step-up circuit shown in FIG. 2 is 900 V and an output voltage is 2,000 V, when the flying capacitors C1 and C2 are charged by using a pre-charge unit, a voltage across C1 after charging may be controlled to be 500 V, and a voltage across C2 after charging may be controlled to be 1,000 V.

The voltage withstood by C1 is the same as that withstood by T1. Therefore, the voltage withstood by T1 is 500 V. The voltage withstood by C2 is a sum of the voltage withstood by T1 and a voltage withstood by T2. Therefore, the voltage withstood by T2 is also 500 V. A voltage withstood by T3 is a difference between the output voltage (2,000 V) and the voltage (1,000 V) withstood by C2. Therefore, the voltage withstood by T3 is 1,000 V. Therefore, the voltages withstood by T1, T2, and T3 are 500 V, 500 V, and 1,000 V, respectively. For T1 and T2, switch components each with a withstand voltage specification of 650 V may be selected, and for T3, a switch component with a withstand voltage specification of 1,200 V may be selected.

During operation of the step-up circuit, voltages withstood by D1, D2, and D3 are the same as those withstood by T1, T2, and T3, respectively. Therefore, for D1 and D2, flyback diodes each with a withstand voltage of 650 V may be selected, and for D3, a flyback diode with a withstand voltage of 1,200 V may be selected. Certainly, a withstand voltage specification selected for D1, D2, or D3 here may alternatively be different from that for T1, T2, or T3, respectively, provided that selection of a withstand voltage specification can ensure that a flyback diode and a corresponding switch component can normally work under a same voltage. For example, for D1, a flyback diode with a withstand voltage of 600 V may be selected.

Generally, when a voltage actually withstood by a switch component is close to a withstand voltage specification, performance of the switch component is good. By contrast, when the voltage actually withstood by the switch component greatly differs from the withstand voltage specification, performance is usually poor. Therefore, in the foregoing example, the switch components each with the withstand voltage specification of 650 V are selected as T1 and T2, and the switch component with the withstand voltage specification of 1,200 V is selected as T3, so that a voltage actually withstood by a switch component is closer to a withstand voltage specification of the switch component, thereby improving system efficiency of the step-up circuit to an extent.

By contrast, according to a traditional scheme, an output voltage of a step-up circuit is often evenly distributed on each switch component, and each switch component has a same withstand voltage specification. For example, according to the traditional scheme, the output voltage of 2,000 V in the step-up circuit shown in FIG. 2 is evenly distributed on each switch component, and therefore T1, T2, and T3 each withstand a voltage of 667 V during operation. When T1, T2, and T3 are all IGBTs, because commonly used withstand voltage specifications of IGBTs are 650 V and 1,200 V, and the voltages withstood by T1, T2, and T3 during operation each are 667 V that is greater than 650 V, IGBTs with the withstand voltage specification of 1,200 V have to be selected as T1, T2, and T3. As a result, the voltages actually withstood by T1, T2, and T3 during operation greatly differ from the withstand voltage specification, and the system efficiency of the step-up circuit is relatively low. By contrast, according to this application, voltage withstanding components with different withstand voltage specifications are selected, so that a voltage actually withstood by each switch component is close to a withstand voltage specification to a maximum extent, thereby improving the system efficiency of the step-up circuit.

According to this application, a voltage across a flying capacitor may be controlled by an on or off time of the N switch components, to control the voltages withstood by the K switch components during normal operation to be different from each other.

For example, as shown in FIG. 2, the withstand voltage specifications of T1 and T2 each are 650 V, the withstand voltage specification of T3 is 1,200 V, the input voltage of the step-up circuit is 900 V, and the output voltage is 2,000 V. In this case, during operation of the step-up circuit, a voltage across C1 or C2 may be controlled by controlling an on or off time of T1, T2, or T3, to maintain a voltage across C1 at 500 V, and maintain a voltage across C2 at 1,000 V, so that the voltages withstood by T1 and T2 during operation each are 500 V, and the voltage withstood by T3 during operation is 1,000 V.

Further, the step-up circuit shown in FIG. 1 further includes an output unit.

As shown in FIG. 1, the output unit includes a resistor R and a capacitor C. The resistor R and the capacitor C are connected in parallel. One end of the resistor R and the capacitor C is connected to the first terminal of the power supply E through a flyback diode. The other end of the resistor R and the capacitor C is connected to the second terminal of the power supply E through a flyback diode.

To avoid damage to switch components (T1 to Tn) caused by an excessive voltage when the step-up circuit is initially powered on, a charging switch may be disposed between a flying capacitor and a corresponding switch component, where the charging switch is closed after the pre-charge unit completes charging the flying capacitor.

Figure 3:
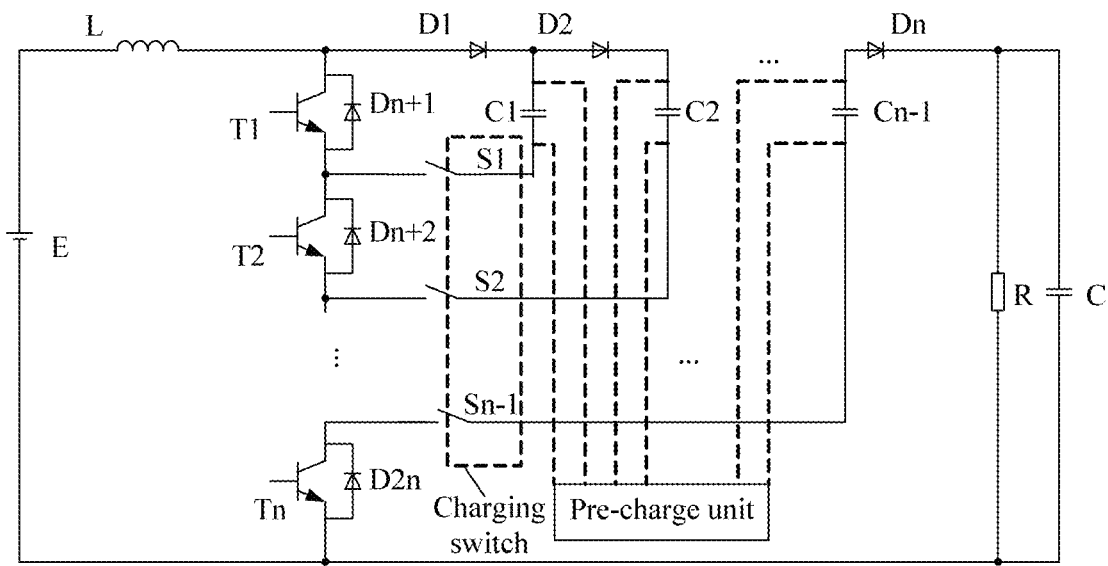
FIG. 3 is a schematic diagram of a step-up circuit according to an embodiment of this application.

As shown in FIG. 3, each flying capacitor (C1 to Cn-1) is connected to a corresponding switch component (T1 to Tn) through a charging switch (S1 to Sn-1). In a step-up circuit shown in FIG. 3, before initial power-on, the charging switches (S1 to Sn-1) are open. Then, each flying capacitor is charged by using a pre-charge unit. When it is detected that voltages across the flying capacitors meet a specification for normal operation, the charging switch (S1 to Sn-1) is closed and the step-up circuit normally works.

According to this application, each flying capacitor is provided with a corresponding charging switch, so that each flying capacitor is charged before the step-up circuit starts working.

However, the step-up circuit shown in FIG. 3 is provided with a large quantity of switches, resulting in high costs. In addition, during normal operation of the step-up circuit, a large current passes when the charging switches are closed, resulting in a high on-state loss and reduced efficiency. Therefore, to reduce the on-state loss and reduce the costs, only one charging switch may be set and the charging switch is connected between an $N^{th}$ switch component and a second terminal of a power supply.

Optionally, in an embodiment, the step-up circuit according to this embodiment of this application further includes a charging switch. The charging switch is disposed between the $N^{th}$ switch component and the second terminal of the power supply. The $N^{th}$ switch component is connected to the power supply when the charging switch is closed, and the $N^{th}$ switch component is disconnected from the power supply when the charging switch is open.

Figure 4:
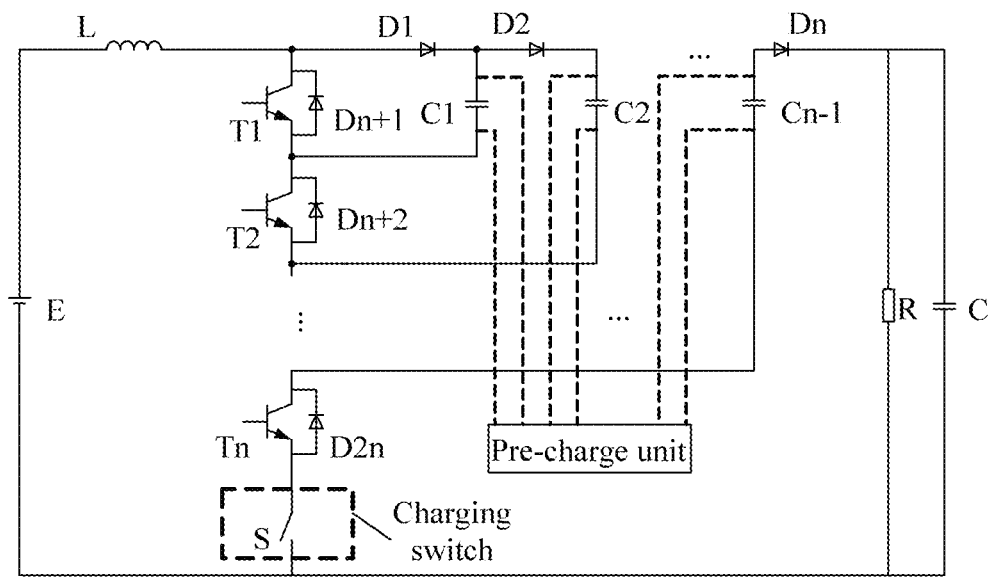
FIG. 4 is a schematic diagram of a step-up circuit according to an embodiment of this application.

Specifically, as shown in FIG. 4, a charging switch S is disposed between the $N^{th}$ switch component and the second terminal of the power supply E. One end of the charging switch S is connected to the switch component Tn, and the other end of the charging switch S is connected to the second terminal of the power supply.

Figure 5:
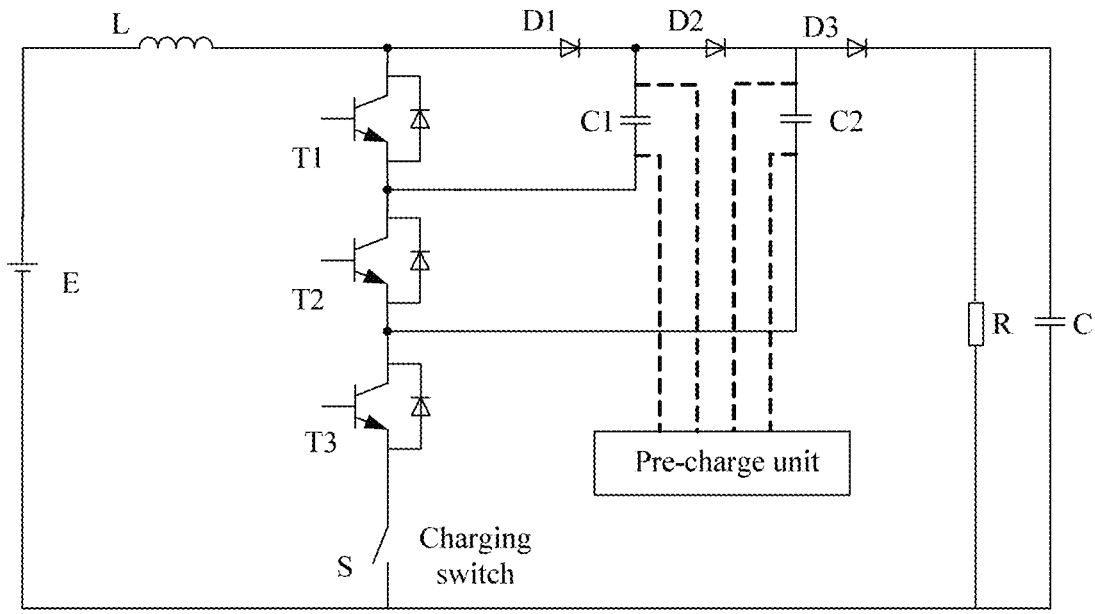
FIG. 5 is a schematic diagram of a step-up circuit according to an embodiment of this application.

For another example, in FIG. 5, the step-up circuit includes three switch components: T1, T2, and T3, and a charging switch S is disposed between T3 and the power supply E.

According to this application, the charging switch S is connected between the $N^{th}$ switch component and the second terminal of the power supply, so that charging of a flying capacitor by using the pre-charge unit can be controlled by using only one charging switch, thereby reducing a quantity of switches. In addition, the charging switch S is connected between the $N^{th}$ switch component and the second terminal of the power supply, so that a total current passing through the charging switch S can be reduced (compared with a case shown in FIG. 3 in which a plurality of switches are used), thereby reducing the on-state loss.

According to this application, the charging switch may include any one of a relay, a contactor, and a bidirectional semiconductor switch. In addition, the charging switch in this application may alternatively be any other switch applicable to a step-up circuit.

According to this application, to further reduce the on-state loss of the step-up circuit, a flyback diode may be connected in parallel to a MOSFET.

Optionally, in an embodiment, each of the N flyback diodes is connected in parallel to a MOSFET.

The on-state loss can be reduced by connecting a MOSFET in parallel to a flyback diode.

Figure 6:
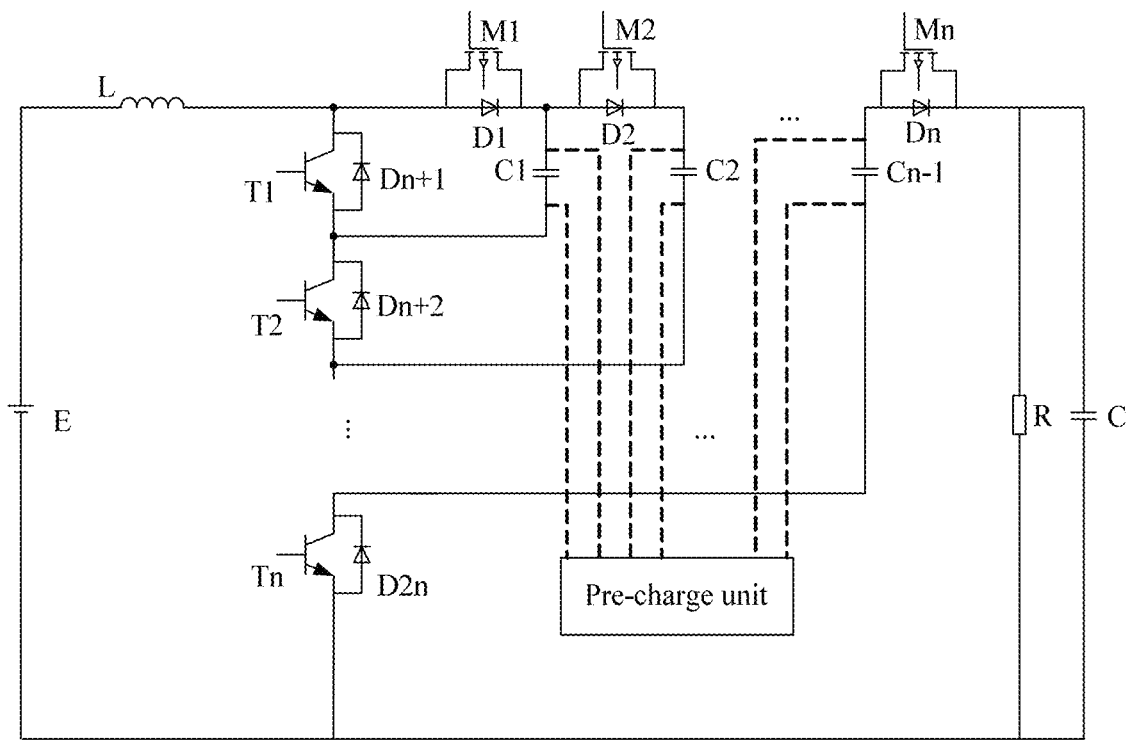
FIG. 6 is a schematic diagram of a step-up circuit according to an embodiment of this application.
Figure 7:
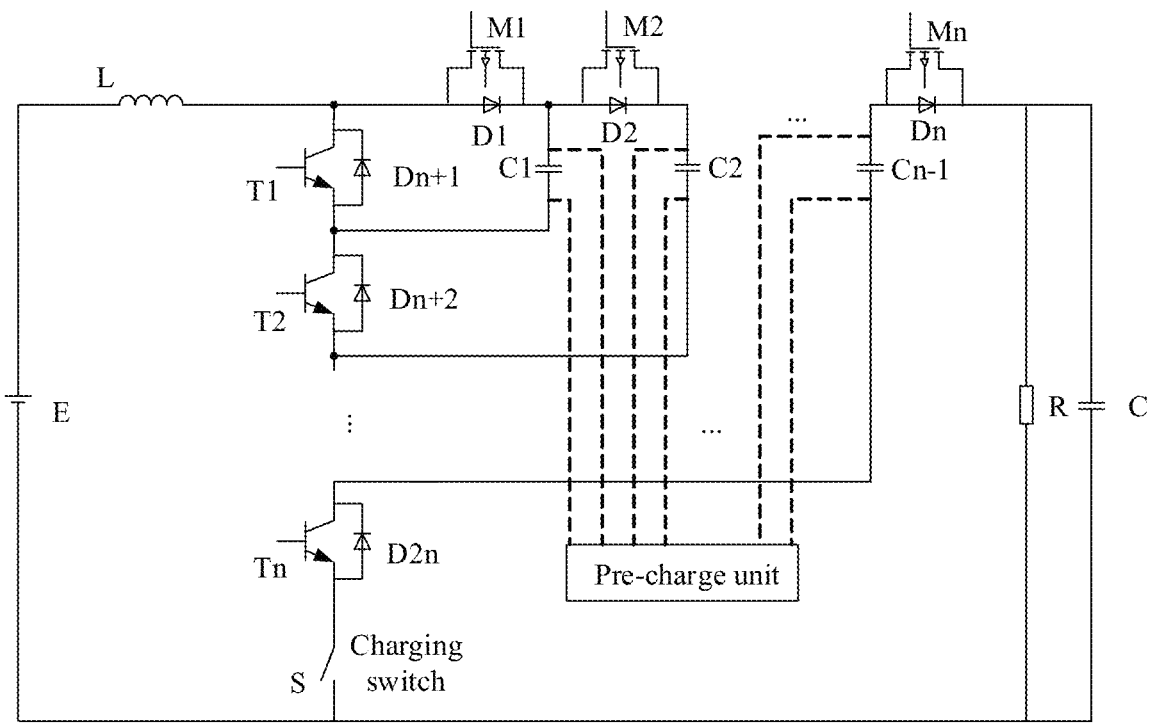
FIG. 7 is a schematic diagram of a step-up circuit according to an embodiment of this application.

As shown in FIG. 6 and FIG. 7, each flyback diode (D1 to Dn) is connected in parallel to a MOSFET. Specifically, D1 is connected in parallel to M1, D2 is connected in parallel to M2, and Dn is connected in parallel to Mn.

In this embodiment of this application, each switch component of the step-up circuit may be connected in reverse parallel to a diode.

Specifically, as shown in FIG. 1, T1 is connected in reverse parallel to a diode Dn+1, T2 is connected in reverse parallel to a diode Dn+2, and Tn is connected in reverse parallel to a diode D2n.

The step-up circuit in this embodiment of this application may be a positive multi-level step-up circuit or a negative multi-level step-up circuit.

A multi-level step-up circuit is generally a step-up circuit that can output a plurality of (generally three or more) different levels. Generally, a step-up circuit that includes more switch components can output more levels.

The step-up circuits shown in FIG. 1 to FIG. 7 are positive multi-level step-up circuits, and the flyback diodes (D1 to Dn) are connected to the positive electrode of the power supply E.

Figure 8:
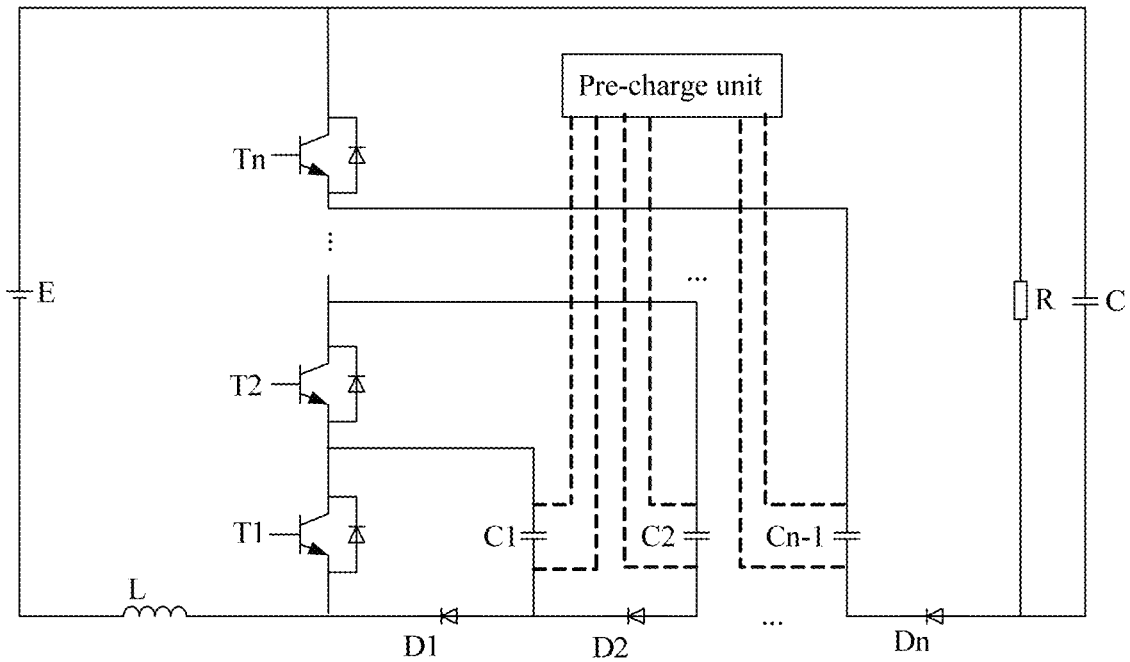
FIG. 8 is a schematic diagram of a step-up circuit according to an embodiment of this application.
Figure 9:
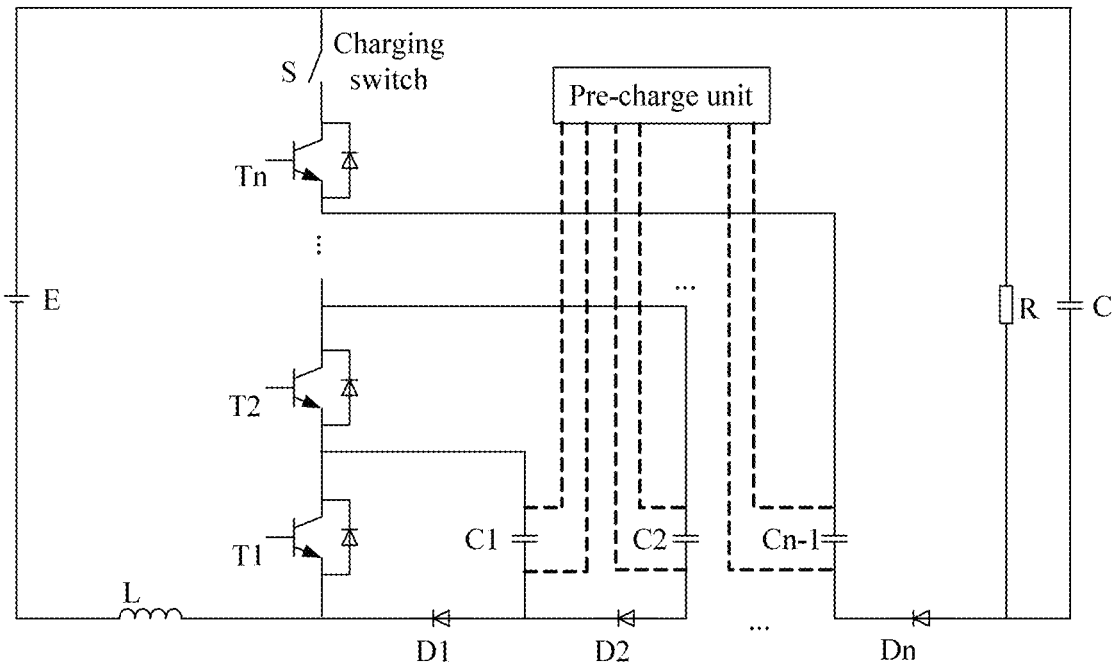
FIG. 9 is a schematic diagram of a step-up circuit according to an embodiment of this application.

The step-up circuits shown in FIG. 8 and FIG. 9 are negative multi-level step-up circuits, and the flyback diodes (D1 to Dn) are connected to the negative electrode of the power supply E.

An embodiment of this application further includes a step-up apparatus, where the step-up apparatus includes the step-up circuit in the embodiments of this application. The step-up apparatus may specifically be a step-up direct current-direct current (DC-DC) conversion apparatus.

The foregoing describes in detail the step-up circuit in the embodiments of this application with reference to FIG. 1 to FIG. 9. The following describes a step-up circuit control method in an embodiment of this application with reference to FIG. 10 and FIG. 11. It should be understood that the step-up circuit control method shown in FIG. 10 and FIG. 11 may control the step-up circuit shown in FIG. 1 to FIG. 9.

Figure 10:
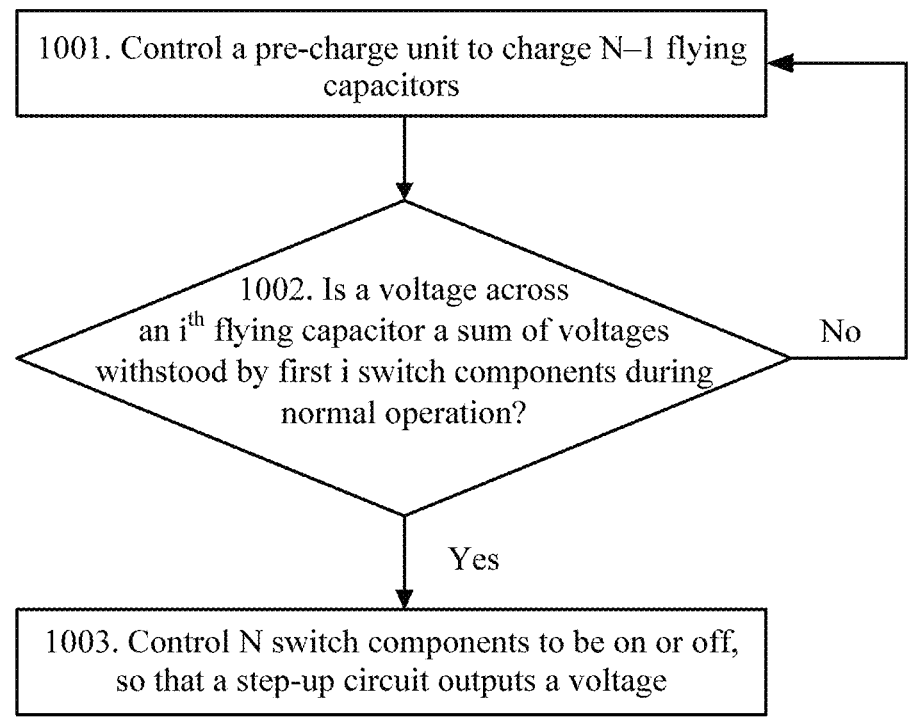
FIG. 10 is a schematic flowchart of a step-up circuit control method according to an embodiment of this application.

FIG. 10 is a schematic flowchart of a step-up circuit control method according to an embodiment of this application. The method shown in FIG. 10 may be implemented by a step-up apparatus that includes the step-up circuit shown in FIG. 1 to FIG. 9. The method shown in FIG. 10 includes steps 1001 to 1003. The steps are described in the following.

1001. Control the pre-charge unit to charge the N-1 flying capacitors.

1002. Determine whether the voltage across the $i^{th}$ flying capacitor is the sum of the voltages withstood by the first i switch components during normal operation.

In step 1002, when the voltage across the $i^{th}$ flying capacitor is determined to be the sum of the voltages withstood by the first i switch components during normal operation, it indicates that charging is completed and the step-up circuit can normally work and output a voltage. That is, step 1003 is performed. In step 1002, when the voltage across the $i^{th}$ flying capacitor is determined not to be the sum of the voltages withstood by the first i switch components during normal operation, it indicates that charging is not completed and needs to be continued. That is, step 1001 is performed.

1003. Control the N switch components to be on or off, so that the step-up circuit outputs a voltage.

In step 1003, a frequency at which the N switch components are turned on or off is controlled, so that voltages that meet different specifications can be output. A specific control process is the same as that of an existing step-up circuit (which may specifically be a boost circuit). Details are not described herein.

According to this application, switch components with different withstand voltage specifications exist in the step-up circuit. The switch components are charged by using the pre-charge unit, so that voltages withstood by some switch components during operation can be close to withstand voltage specifications of the switch components. Therefore, compared with a traditional scheme in which switch components with a same withstand voltage specification are selected for a step-up circuit, a voltage actually withstood by a switch component of the step-up circuit can be closer to a withstand voltage specification of the switch component, thereby improving system efficiency of the step-up circuit.

When a charging switch exists in the step-up circuit, the charging switch may be open before step 1001 is performed.

In addition, when the charging switch exists in the step-up circuit, if the pre-charge unit completes charging the flying capacitors, the charging switch may be closed, and then step 1003 is performed to control the N switch components to be on or off, so that the step-up circuit outputs a voltage.

Optionally, in an embodiment, the step-up circuit includes a charging switch. Before step 1001 is performed, the method shown in FIG. 10 further includes controlling the charging switch to be open. In addition, after the pre-charge unit completes charging the N-1 flying capacitors, the method shown in FIG. 10 further includes controlling the charging switch to be closed.

It should be understood that in this embodiment of this application, after the pre-charge unit completes charging the flying capacitors, the pre-charge unit terminates working.

For example, in the step-up circuit shown in FIG. 4, the charging switch S is first open, and then the pre-charge unit is controlled to charge the flying capacitors C1 to Cn-1. After the pre-charge unit completes charging the flying capacitors C1 to Cn-1, the charging switch S is closed, and then the switch components T1 to Tn are controlled to be on or off to control the step-up circuit to output a voltage.

According to this application, a flying capacitor can be flexibly charged by using the charging switch.

Figure 11:
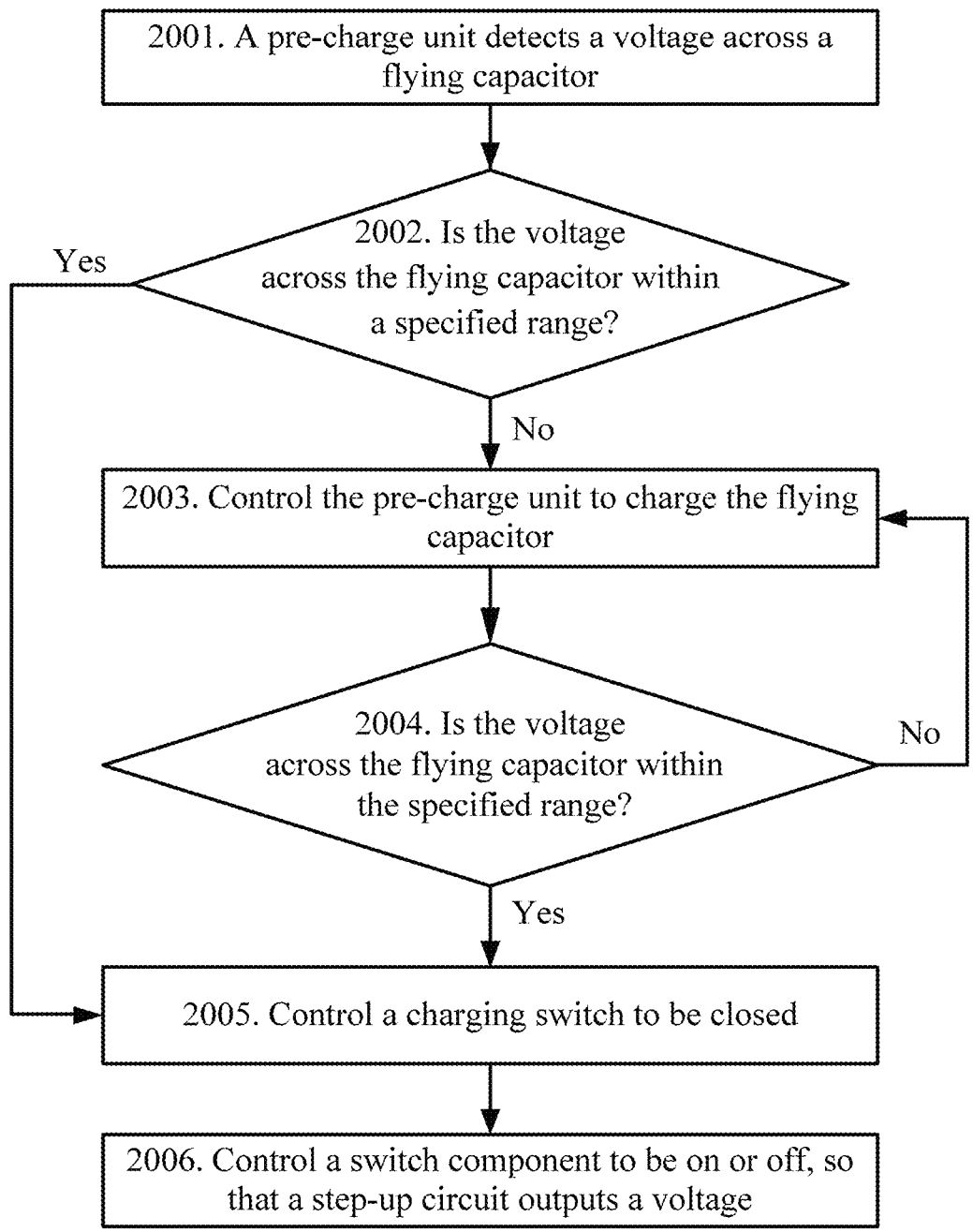
FIG. 11 is a schematic flowchart of a step-up circuit control method according to an embodiment of this application.

To better understand a detailed process of the step-up circuit control method in this embodiment of this application, the following further provides a detailed description with reference to FIG. 11.

FIG. 11 is a schematic flowchart of a step-up circuit control method according to an embodiment of this application. The method shown in FIG. 11 may be controlled by a step-up apparatus that includes the step-up circuit shown in FIG. 1 to FIG. 9. The method shown in FIG. 11 includes steps 2001 to 2006. The steps are described in the following.

2001. The pre-charge unit detects a voltage across a flying capacitor.

2002. Determine whether the voltage across the flying capacitor is within a specified range.

The voltage across the flying capacitor may be detected by using the pre-charge unit. Therefore, before the flying capacitor is charged by using the pre-charge unit, whether the voltage withstood by the flying capacitor meets a specification may be first determined. If the voltage withstood by the flying capacitor meets the specification, the flying capacitor no longer needs to be charged by using the pre-charge unit and step 2005 may be performed. However, when the voltage withstood by the flying capacitor does not meet the specification, the flying capacitor needs to be charged by using the pre-charge unit. That is, step 2003 is performed.

In step 2002, the determining whether the voltage across the flying capacitor is within a specified range may mean determining whether the voltage across the flying capacitor is the sum of the voltages withstood by the first i switch components during normal operation.

Specifically, for C1, whether a voltage across C1 is equal to a voltage withstood by T1 during normal operation may be determined, and for C2, whether a voltage across C2 is equal to a sum of voltages withstood by T1 and T2 during normal operation may be determined.

2003. Control the pre-charge unit to charge the flying capacitor.

2004. Determine whether the voltage across the flying capacitor is within the specified range.

After step 2003, whether the voltage across the flying capacitor is within the specified range still is to be determined. A manner of determining whether the voltage across the flying capacitor is within the specified range in step 2003 is the same as that in step 2002. In step 2004, whether the voltage across the flying capacitor is within the specified range may be determined in real time during charging or may be determined every other specific time.

Specifically, the step-up circuit shown in FIG. 4 is used as an example. In step 2004, whether voltages withstood by the flying capacitors C1 to Cn-1 is within specified ranges is determined.

When the voltage across the flying capacitor is determined to be within the specified range in step 2004, it indicates that charging of the flying capacitor is completed. Then, the charging switch may be controlled to be closed. That is, step 2005 is performed. However, when the voltage across the flying capacitor is determined to be out of the specified range in step 2004, it indicates that charging of the flying capacitor is not completed. In this case, step 2003 is performed to continue to charge the flying capacitor.

2005. Control the charging switch to be closed.

2006. Control a switch component to be on or off, so that a step-up circuit outputs a voltage.

After the charging switch is closed, the step-up circuit can then start to normally work. During normal operation of the step-up circuit, the switch component may be controlled to be on or off, so that the step-up circuit outputs a voltage.

For example, as shown in FIG. 4, an on or off period of T to Tn is controlled, so that the step-up circuit outputs different voltages.

In step 2006, a specific manner of controlling the switch component is the same as an existing manner of controlling a step-up circuit. Details are not described herein.

When the step-up circuit needs to terminate working, a voltage of a base of the switch component may be first controlled to make the switch component enter a cut-off state, and then the charging switch is open.

Specifically, for example, in the step-up circuit shown in FIG. 4, when the step-up circuit needs to terminate working, voltages of bases of the switch components T1 to Tn may be controlled to make the switch components enter a cut-off state (equivalent to an off state), and then the charging switch S is open (also referred to as "turned off"), so that the step-up circuit enters an "off state".

A person of ordinary skill in the art is aware that, in light of the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual specifications to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A step-up circuit, comprising:
a power supply having a first terminal and a second terminal;
an inductor connected to the first terminal of the power supply;
N switch components, wherein the N switch components are connected in series, the N switch components including a first switch component having a first terminal, K switch components, and an Nth switch component having a second terminal, wherein:
the first terminal of the first switch component is connected to the first terminal of the power supply through the inductor,
the second terminal of the Nth switch component is connected to the second terminal of the power supply,
the K switch components of the N switch components have withstand voltage specifications different from each other, voltages withstood by the K switch components during normal operation are different from each other,
both N and K are positive integers,
N>1, and
K≤N;
N-1 flying capacitors, wherein:
an ith flying capacitor of the N-1 flying capacitors corresponds to first i switch components of the N switch components,
the ith flying capacitor having a first terminal and a second terminal,
during normal operation of the step-up circuit, a voltage withstood by the ith flying capacitor is a sum of voltages withstood by the first i switch components, and
i is a positive integer less than N;
N flyback diodes having an ith flyback diode, wherein:
the N flyback diodes correspond to the N switch components on a one-to-one basis so that the ith flyback diode corresponds to an ith switch component of the N switch components,
a voltage withstood by the ith flyback diode is the same as that withstood by the ith switch component of the N switch components,
the ith switch component of the N switch components having a first terminal and a second terminal,
the first terminal of the ith flying capacitor is connected to the first terminal of the first switch component through first i flyback diodes, and
the second terminal of the ith flying capacitor is connected to the second terminal of the ith switch component; and
a pre-charge unit, configured to charge the N-1 flying capacitors before the step-up circuit outputs a voltage, so that the voltage across the ith flying capacitor is the sum of the voltages withstood by the first i switch components of the N switch components during normal operation;
wherein a voltage withstood by the ith switch component of the N switch components is the sum of voltages withstood by the first i-1 switch components of the N switch components, the i-1 switch components being connected in series and the ith switch component being connected in series with the i-1 switch components.

2. The step-up circuit according to claim 1, wherein K flyback diodes of the N flyback diodes have withstand voltage specifications different from each other, and the K flyback diodes correspond to the K switch components on a one-to-one basis.

3. The step-up circuit according to claim 1, wherein the step-up circuit further comprises:
a charging switch, wherein:
the charging switch is disposed between the Nth switch component and the second terminal of the power supply,
the Nth switch component is connected to the power supply when the charging switch is closed, and
the Nth switch component is disconnected from the power supply when the charging switch is open.

4. The step-up circuit according to claim 1, wherein at least one of the N flyback diodes is connected in parallel to a metal-oxide-semiconductor field-effect transistor (MOSFET), and the MOSFET has a third quadrant conduction feature.

5. The step-up circuit according to claim 1, wherein each of the N switch components comprises an insulated gate bipolar transistor (IGBT), or a metal-oxide-semiconductor field-effect transistor (MOSFET).

6. The step-up circuit according to claim 1, further comprising a plurality of diodes wherein each switch component of the N switch components is connected in reverse parallel to a different diode of the plurality of diodes.

7. The step-up circuit according to claim 1, wherein the step-up circuit comprises a positive multi-level step-up circuit.

8. The step-up circuit according to claim 1, wherein the step-up circuit comprises a negative multi-level step-up circuit.

9. A method of controlling a step-up circuit, comprising:
controlling a pre-charge unit to charge N-1 flying capacitors, so that a voltage across an ith flying capacitor of the N-1 flying capacitors is the sum of voltages withstood by first i switch components of N switch components during normal operation; and
controlling the N switch components to be on or off, so that the step-up circuit outputs a voltage;
wherein:
the step-up circuit comprises a power supply, an inductor, the N switch components, the N-1 flying capacitors, N flyback diodes, and the pre-charge unit;
the power supply having a first terminal and a second terminal,
the N switch components including a first switch component having a first terminal, K switch components, and an Nth switch component having a second terminal,
the inductor is connected to the first terminal of the power supply,
the N switch components are connected in series,
the first terminal of the first switch component is connected to the first terminal of the power supply through the inductor,
the second terminal of the Nth switch component is connected to the second terminal of the power supply,
the K switch components of the N switch components have withstand voltage specifications different from each other, voltages withstood by the K switch components during normal operation are different from each other,
both N and K are positive integers,
N>1, and K≤N;

an ith flying capacitor of the N-1 flying capacitors corresponds to first i switch components of the N switch components, during normal operation of the step-up circuit, a voltage withstood by the ith flying capacitor is a sum of voltages withstood by the first i switch components, wherein i is a positive integer less than N;

the N flyback diodes correspond to the N switch components on a one-to-one basis so that the ith flyback diode corresponds to an ith switch component of the N switch components, the ith flyback diode having a first terminal and a second terminal, a voltage withstood by the ith flyback diode of the N flyback diodes is the same as that withstood by the ith switch component of the N switch components, the first terminal of the ith flying capacitor is connected to the first terminal of the first switch component through first i flyback diodes, a second terminal of the ith flying capacitor is connected to a second terminal of the ith switch component; and the pre-charge unit is configured to charge the N-1 flying capacitors before the step-up circuit outputs a voltage, so that the voltage across the ith flying capacitor is the sum of the voltages withstood by the first i switch components of the N switch components during normal operation;

wherein a voltage withstood by the ith switch component of the N switch components is the sum of voltages withstood by the first i-1 switch components of the N switch components, the i-1 switch components being connected in series and the ith switch component being connected in series with the i-1 switch components.

10. The method according to claim 9, wherein the step-up circuit further comprises a charging switch, wherein the method further comprises:
opening the charging switch before the controlling the pre-charge unit to charge the N-1 flying capacitors; and
after the pre-charge unit completes charging the N-1 flying capacitors, closing the charging switch.

11. The method according to claim 9, wherein K flyback diodes of the N flyback diodes have withstand voltage specifications different from each other, and the K flyback diodes correspond to the K switch components on a one-to-one basis.

12. The method according to claim 9, wherein the step-up circuit further comprises:
a charging switch, wherein:
the charging switch is disposed between the Nth switch component and the second terminal of the power supply,
the Nth switch component is connected to the power supply when the charging switch is closed, and
the Nth switch component is disconnected from the power supply when the charging switch is open.

13. The method according to claim 9, wherein at least one of the N flyback diodes is connected in parallel to a metal-oxide-semiconductor field-effect transistor (MOSFET), and the MOSFET has a third quadrant conduction feature.

14. The method according to claim 9, wherein each of the N switch components comprises an insulated gate bipolar transistor (IGBT) or a metal-oxide-semiconductor field-effect transistor (MOSFET).

15. The method according to claim 9, further comprising a plurality of diodes wherein each switch component of the N switch components is connected in reverse parallel to a different diode of the plurality of diodes.

16. The method according to claim 9, wherein the step-up circuit comprises a positive multi-level step-up circuit.

17. The method according to claim 9, wherein the step-up circuit comprises a negative multi-level step-up circuit.

18. A step-up apparatus, comprising a step-up circuit, and the step-up circuit comprises:
a power supply having a first terminal and a second terminal;
an inductor;
N switch components, the N switch components including a first switch component having a first terminal, K switch components, and an Nth switch component having a second terminal;
N-1 flying capacitors;
N flyback diodes; and
a pre-charge unit;
wherein:
the inductor is connected to the first terminal of the power supply,
the N switch components are connected in series, the first terminal of the first switch component is connected to the first terminal of the power supply through the inductor,
the second terminal of the Nth switch component is connected to the second terminal of the power supply,
K switch components of the N switch components have withstand voltage specifications different from each other, voltages withstood by the K switch components during normal operation are different from each other,
both N and K are positive integers,
N>1, and
K≤N,
an ith flying capacitor of the N-1 flying capacitors corresponds to first i switch components of the N switch components,
during normal operation of the step-up circuit, a voltage withstood by the ith flying capacitor is a sum of voltages withstood by the first i switch components,
i is a positive integer less than N;
the N flyback diodes correspond to the N switch components on a one-to-one basis, a voltage withstood by an ith flyback diode of the N flyback diodes is the same as that withstood by an ith switch component of the N switch components, a first terminal of the ith flying capacitor is connected to the first terminal of the first switch component through first i flyback diodes, and a second terminal of the ith flying capacitor is connected to a second terminal of the ith switch component; and
the pre-charge unit is configured to charge the N-1 flying capacitors before the step-up circuit outputs a voltage, so that the voltage across the ith flying capacitor is the sum of the voltages withstood by the first i switch components of the N switch components during normal operation;
wherein a voltage withstood by the ith switch component of the N switch components is the sum of voltages withstood by the first i-1 switch components of the N switch components, the i-1 switch components being connected in series and the ith switch component being connected in series with the i-1 switch components.

19. The step-up apparatus according to claim 18, wherein;
K flyback diodes of the N flyback diodes have withstand voltage specifications different from each other, and
the K flyback diodes correspond to the K switch components on a one-to-one basis.

20. The step-up apparatus according to claim 18, the step-up circuit further comprises a charging switch, wherein:
the charging switch is disposed between the Nth switch component and the second terminal of the power supply,
the Nth switch component is connected to the power supply when the charging switch is closed, and
the Nth switch component is disconnected from the power supply when the charging switch is open.

* * * * *